US007757177B1

(12) United States Patent
Bohm et al.

(10) Patent No.: US 7,757,177 B1
(45) Date of Patent: Jul. 13, 2010

(54) VIRTUAL FORMS

(75) Inventors: Matthew B. Bohm, San Francisco, CA (US); Craig R. McClanahan, Tualatin, OR (US)

(73) Assignee: Oracle America, Inc., Redwood City, CA (US)

( * ) Notice: Subject to any disclaimer, the term of this patent is extended or adjusted under 35 U.S.C. 154(b) by 703 days.

(21) Appl. No.: 11/385,519

(22) Filed: Mar. 21, 2006

(51) Int. Cl.
*G06F 3/00* (2006.01)
(52) U.S. Cl. .................. 715/760; 715/221; 715/762
(58) Field of Classification Search ............. 715/221, 715/760, 762, 780–782, 821
See application file for complete search history.

(56) References Cited

U.S. PATENT DOCUMENTS

| | | | | |
|---|---|---|---|---|
| 5,872,973 | A * | 2/1999 | Mitchell et al. | 719/332 |
| 6,330,006 | B1 * | 12/2001 | Goodisman | 715/762 |
| 6,915,454 | B1 * | 7/2005 | Moore et al. | 714/38 |
| 6,948,133 | B2 * | 9/2005 | Haley | 715/780 |
| 6,950,831 | B2 * | 9/2005 | Haley | 707/104.1 |
| 7,013,340 | B1 * | 3/2006 | Burd et al. | 709/229 |
| 7,275,216 | B2 * | 9/2007 | Paoli et al. | 715/763 |
| 2003/0001893 | A1 * | 1/2003 | Haley | 345/762 |
| 2004/0034833 | A1 * | 2/2004 | Kougiouris et al. | 715/513 |
| 2005/0065970 | A1 * | 3/2005 | King et al. | 707/102 |
| 2005/0066287 | A1 * | 3/2005 | Tattrie et al. | 715/769 |
| 2005/0267913 | A1 * | 12/2005 | Stienhans et al. | 707/200 |
| 2006/0230379 | A1 * | 10/2006 | Pintos | 717/109 |

OTHER PUBLICATIONS

360 Impact, Group Validator Version 1.0, Mar. 6, 2003, pp. 1-8.*
Microsoft, Visual Studio 2005, Jul. 28, 2004, Validation ASP.NET Controls, pp. 1-11, http://msdn2.microsoft.com/en-us/library/ah5a961d(VS.80).aspx.*
Pociu, Andre, Group Validation in ASP.NET 2.0, Jul. 27, 2005, www.tutorialized.com/view/tutorial/Group-validation-in-ASP.NET-2.0/12673.*
Apache, Struts, http://struts.apache.org/.*
Muench, Building a Web Store with Struts & ADF Frameworks, May 4, 2005, pp. 106-107, 123-124.*
Stearns, Virtual Forms in the Sun Java Studio Creator 2 IDE, Jun. 2005, pp. 1-4.*
Wikipedia, JavaServer Faces, http://en.wikipedia.org/wiki/JavaServer_Faces.*
http://developers.sun.com/jsp_utils/PrintPage.jsp?url=http%3A%2F%2Fdevelopers.sun.com "Java Studio Creator 2—Early Access—Introductions to Virtual Forms" Sun Microsystems, Inc.—Jul. 19, 2005 (8 pages).

* cited by examiner

*Primary Examiner*—Ba Huynh
*Assistant Examiner*—Enrique W Iturralde
(74) *Attorney, Agent, or Firm*—Brooks Kushman P.C.

(57) ABSTRACT

A technology enabling a developer to configure a graphical user interface (GUI) such that only a subset of the inputs contained in the GUI will be processed, depending on the user's interaction with the GUI. The configuration identifies one or more logical units known as virtual forms, with each virtual form identifying zero or more input components from the GUI that are said to participate in the virtual form, and one or more submission components from the GUI that are said to submit the virtual form, such that when a user interacts in some particular way with (e.g., clicks) a component that submits a virtual form, only the inputs that participate in that virtual form are processed while other inputs in the GUI are not processed.

12 Claims, 6 Drawing Sheets

VIRTUAL FORMS

BACKGROUND OF THE INVENTION

1. Field of the Invention

The present invention relates to input processing frameworks and more particularly to the ability of a software application developer to configure a graphical user interface (GUI) such that only a subset of the user inputs contained in the GUI will be processed by the framework, where the particular subset to be processed depends upon the user's interaction with the GUI.

2. Description of the Related Art

Input processing frameworks are software programs that use an inversion of control principle to make developing applications easier. Input processing frameworks provide functionality and structure common to any application that uses such frameworks, manage the life cycle of the application (which includes the application's response to user gestures), and call application-specific code (i.e., code that is part of an application using the framework, not code that is part of the framework itself) at predetermined points in that life cycle.

Input processing frameworks also perform user input processing. That is, input processing frameworks invoke framework and/or application-specific code to perform common operations on (e.g., process) user input, where such user input is typically entered into a graphical user interface (GUI). Examples of such processing operations include decoding the user input from an overall request, converting input to a different object type, verifying that the request is permitted given both the input and the current application state (including user-specific application state), validating individual input values to ensure that the user did not make an erroneous entry, and copying the input to a model that is shared by multiple user interface (UI) components (possibly across multiple requests). The JavaServer Faces framework, developed by Sun Microsystems, is an example of a web-based input processing framework that performs many of these operations.

While input processing frameworks are in fairly common use today for web-based application development, they have not gained the same level of acceptance for developing rich client applications (e.g., Java Swing clients). However, this may change in the future. Examples of input processing frameworks include the JavaServer Faces framework, developed by Sun Microsystems, and the .NET framework, developed by Microsoft Corporation.

Applications that use input processing frameworks typically present one or more graphical user interfaces (GUIs) that display information and accept user input. Some of the components within a GUI may be said to be input components, that is, those that accept user input, such as a text field, text area, dropdown list, or radio button. Other components within a GUI may be said to be process initiating or submission components, that is, those capable of initiating input processing. Some components within a GUI may be both.

While, literally speaking, an input processing framework does not process the input components themselves but rather the user input supplied to such components, for the sake of simplicity, the processing of input components (or an input component subset) is intended to mean the processing of the user input supplied to such components (or to such an input component subset). Also, a framework means an input processing framework unless noted otherwise.

Known input processing frameworks, such as the JavaServer Faces framework and the .NET framework, while capable of performing user input processing, provide only limited support for conditionally processing a subset of the input components within a GUI (while not processing the remaining inputs), where the subset to be processed is determined by the process initiating or submission component in the GUI with which the user chooses to interact.

By way of example, consider a GUI that contains submission component A and submission component B. If the user interacts with (e.g., clicks) submission component A, the developer of this application wants a particular subset of the input components within the GUI to be processed by the input processing framework, while not processing the remaining inputs. This subset may be referenced as subset A. Likewise, if the user interacts with submission component B, the developer wants a different subset of the input components within the GUI to be processed by the input processing framework, while not processing the remaining inputs. This subset may be referenced as subset B. Some input components in the GUI are in both subset A and subset B.

Known input processing frameworks, such as the JavaServer Faces framework and the .NET framework, provide only limited support for such capabilities within a GUI. For example, the JavaServer Faces framework has what is informally referred to as the "immediate" mechanism. This mechanism allows an application developer to specify a maximum of one subset of the input components in a web page form to undergo certain processing operations, and "short circuit" the JavaServer Faces life cycle to prevent processing of the other inputs. However, the mechanism does not provide a way to specify multiple such subsets.

Likewise, the ASP.NET 2.0 framework has a mechanism known as "validation groups." This mechanism is structured around one particular operation involved in processing, namely, validation. Validation groups are not associated with input components directly; a validation group actually comprises one or more submission components and one or more validators, where each validator is mapped to an input component. In ASP.NET 2.0, a validator can be mapped to one input component only; it cannot be mapped to multiple input components. Therefore, in order to associate an input component with multiple validation groups, it is necessary to create multiple validators that perform the exact same function, map each of those validators to the input component, and associate each validator with a different validation group. Also, because validation groups are not associated with input components directly but rather with validators that are mapped to the input components, validation groups are a poor solution in cases where an input component subset that needs to be selectively processed based on user gesture has one or more members that do not require validation checks. For instance, say a GUI contains a submission component which, when activated, must trigger exclusive processing on a subset of the available input components in the GUI. Let us say this subset comprises three input components. When the submission component is activated, the input from two of these input components must be both validated and mapped onto binding targets, while the input from the third input component must be mapped onto a binding target but does not require validation checks. Meanwhile, the remaining input components in the GUI must not undergo any processing operations, including validation and mapping onto binding targets, when the user activates the submission component. The ASP.NET 2.0 validation groups mechanism does not adequately support such a GUI, for although it would be possible to create a validation group and associate it with both the submission component and with validators that were mapped to the first and second input components, associating the third input component with the validation group would require the existence of a validator that was both associated with the validation group and mapped to the third input component, despite the fact that the third input component requires no validation checks.

Multiple HTML forms are also known to be used in web applications. When the user performs a gesture in the browser that submits an HTML form, such as clicking a button in that form, only the inputs in the submitted form are sent to the server, while inputs in any other forms on the page are not sent to the server. Therefore, if the server-side application uses an input processing framework, only the inputs in the submitted form will be processed. However, this approach is limited insofar as it is not possible to have an input field reside in more than one HTML form. Also, using multiple HTML forms imposes topographical limitations. For instance, it is not possible to put two input fields that are located within the same HTML table into two different HTML forms.

Accordingly, it is desirable to provide a mechanism by which a software application developer can specify one or more subsets of input components within a GUI, where each such subset can contain zero or more input components, and where each such subset is associated with one or more submission components within the GUI. Furthermore, for purposes of developer usability, it is desirable to permit any submission component within the GUI to be associated with at most one such input component subset. (If the developer wishes a submission component to be associated with a union of multiple input component subsets, the developer can specify an additional composite subset that consists of the union of those input component subsets, and subsequently associate the submission component with the composite subset.) As part of the mechanism, when a user interacts with a submission component in the GUI that is associated with an input component subset, the input processing framework processes the input component subset associated with that submission component and forgoes processing of the remaining inputs. Furthermore, it is desirable that any input component within the GUI be permitted to appear in multiple such input component subsets.

SUMMARY OF THE INVENTION

The present invention, known generally as virtual forms, enables a developer to specify one or more subsets of input components within a GUI. The present invention also enables a developer to associate each submission component in the GUI with at most one such input component subset, such that a user's interacting in some way with the submission component that is associated with an input component subset causes the input processing framework to process only the input from the associated input component subset while foregoing processing of input from all other input components in the GUI. Such an input component subset combined with all submission components associated with that input component subset are together known as a "virtual form." The members of the input component subset are said to "participate" in the virtual form, while the associated submission components are said to "submit" the virtual form or be "submitters" of that virtual form. When a user interacts with a virtual form submitter and thus initiates exclusive processing of the virtual form participants, the virtual form is said to be "submitted." While any given submission component in the GUI may submit at most one virtual form, any given virtual form may have multiple submitters. A virtual form must have zero or more participants and one or more submitters. An input component in the GUI is permitted to participate in zero or more virtual forms. Also, as mentioned earlier, it is possible for a component to be both an input component and a submission component. This means that such a component may be configured by the developer to submit a particular virtual form and also participate in that same and/or other virtual forms. Furthermore, if a user initiates input processing by interacting with a submission component not configured by the developer as submitting a virtual form, then all the inputs in the GUI are processed, just as is typically done when no virtual forms are specified. Note that a GUI that makes use of virtual forms is permitted to contain components that neither participate in nor submit any virtual form.

When a virtual form is submitted, the non-participating input components are not processed. Some virtual form implementations may differ with respect to the treatment of the unprocessed entries. In a web environment, one acceptable approach is simply to discard the unprocessed entries. With this approach, if the same web page is redisplayed, the non-participating input components typically display their most recently processed values. Another approach is to offer the feature of conditionally retaining or discarding the unprocessed entries. This is the approach taken by the Sun Java Studio Creator 2 tool produced by Sun Microsystems. In that tool, the submitted values (unprocessed entries) of non-participating input components are retained by default and displayed by those input components if the page is redisplayed. In cases where the application developer wants to discard the submitted values of certain non-participating input components, such as when a user selects a new master in a master/detail scenario, the developer can utilize a small API for explicitly doing so. Any non-participating input component for which the submitted value has been discarded will display its value (most recently processed value) rather than its submitted value.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
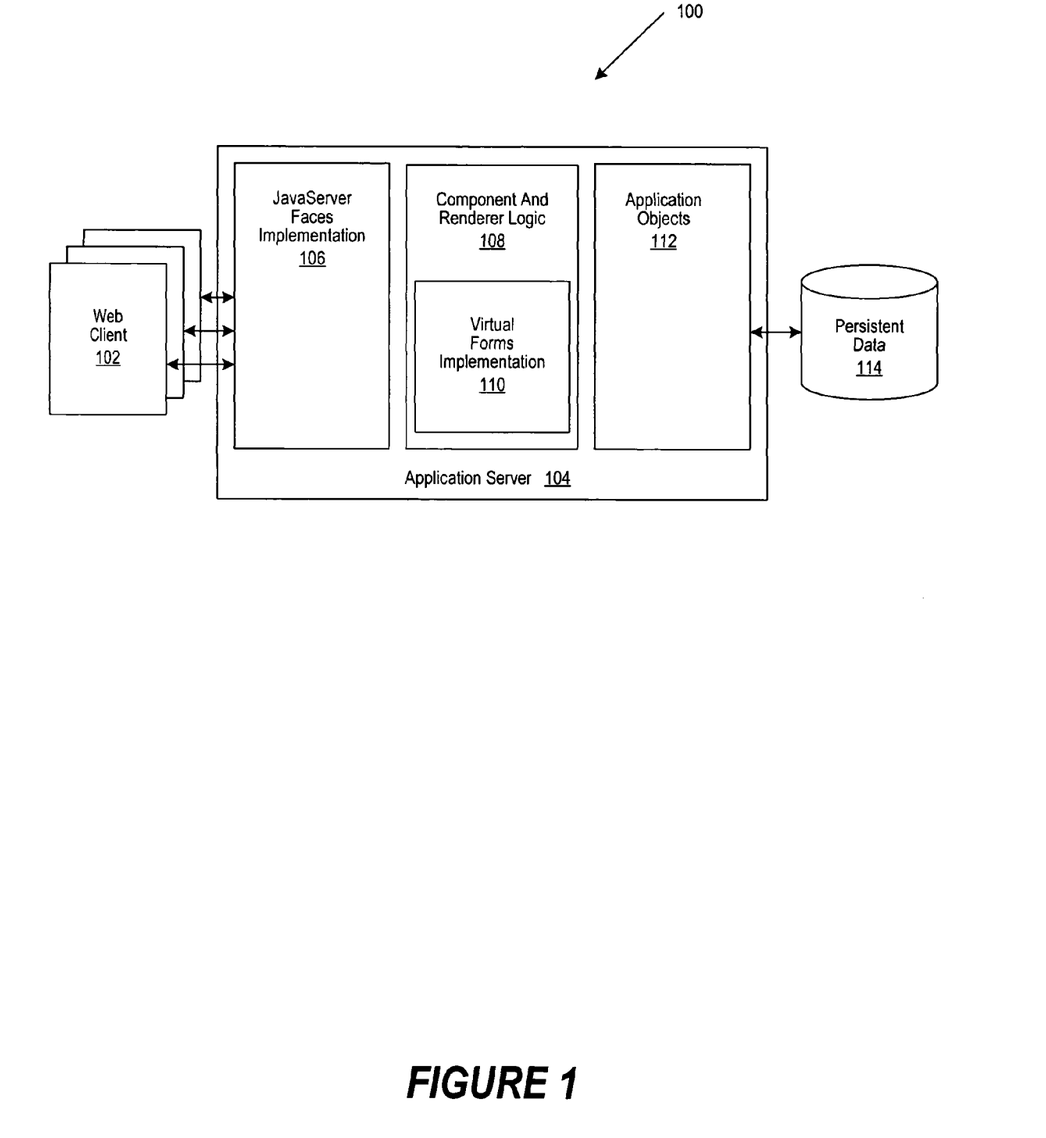
FIG. 1 shows a block diagram of a runtime implementation of virtual forms on a multi-tier architecture.

Referring to FIG. 1, a block diagram of a multi-tier information handling architecture 100 is shown. The multi-tier information handling architecture 100 includes a Web client (e.g., browser) 102, an application server 104, and persistent data 114. Application server 104 includes JavaServer Faces implementation 106, component and renderer logic 108, and application objects 112. Component and renderer logic 108 includes virtual forms implementation 110. Application servers are programs residing on a computer platform and provide system-level services for application programs. The application server can be deployed on a variety of networks (e.g., local, wide area, wireless, etc.) and provides program output to the client program (e.g., browser) that resides either in the same computer or another computer connected through the network. The multi-tier information handling architecture 100 may include many tiers. For example, a presentation tier (which includes Web client 102, the JavaServer Faces implementation 106, and Component and Renderer Logic 108 of the application server 104) can provide the presentation user interface and associated logic for creating a dynamic user interface. A data tier (which includes persistent data 114 and data access logic contained in application objects 112) controls data storage and management. Many other tiers are possible, and their implementation may span highly distributed computer platforms deployed across multiple networks.

For purposes of this disclosure, the present invention is described in the context of multi-tiered information handling architecture 100 illustrated in FIG. 1. However, the present invention can generally operate on any type of computing environment that can accommodate computational instructions including any instrumentality or aggregate of instrumentalities operable to compute, classify, process, transmit, receive, retrieve, originate, store, display, manifest, detect, record, reproduce, handle, or utilize any form of information, intelligence or data for business, scientific, control or other purposes. For example an information handling system may be a personal computer, a network storage device, or any other suitable device and may vary in size, shape performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components. Hence, the present invention is not limited to the specific multi-tiered information handling architecture 100 illustrated in FIG. 1.

Figure 2:
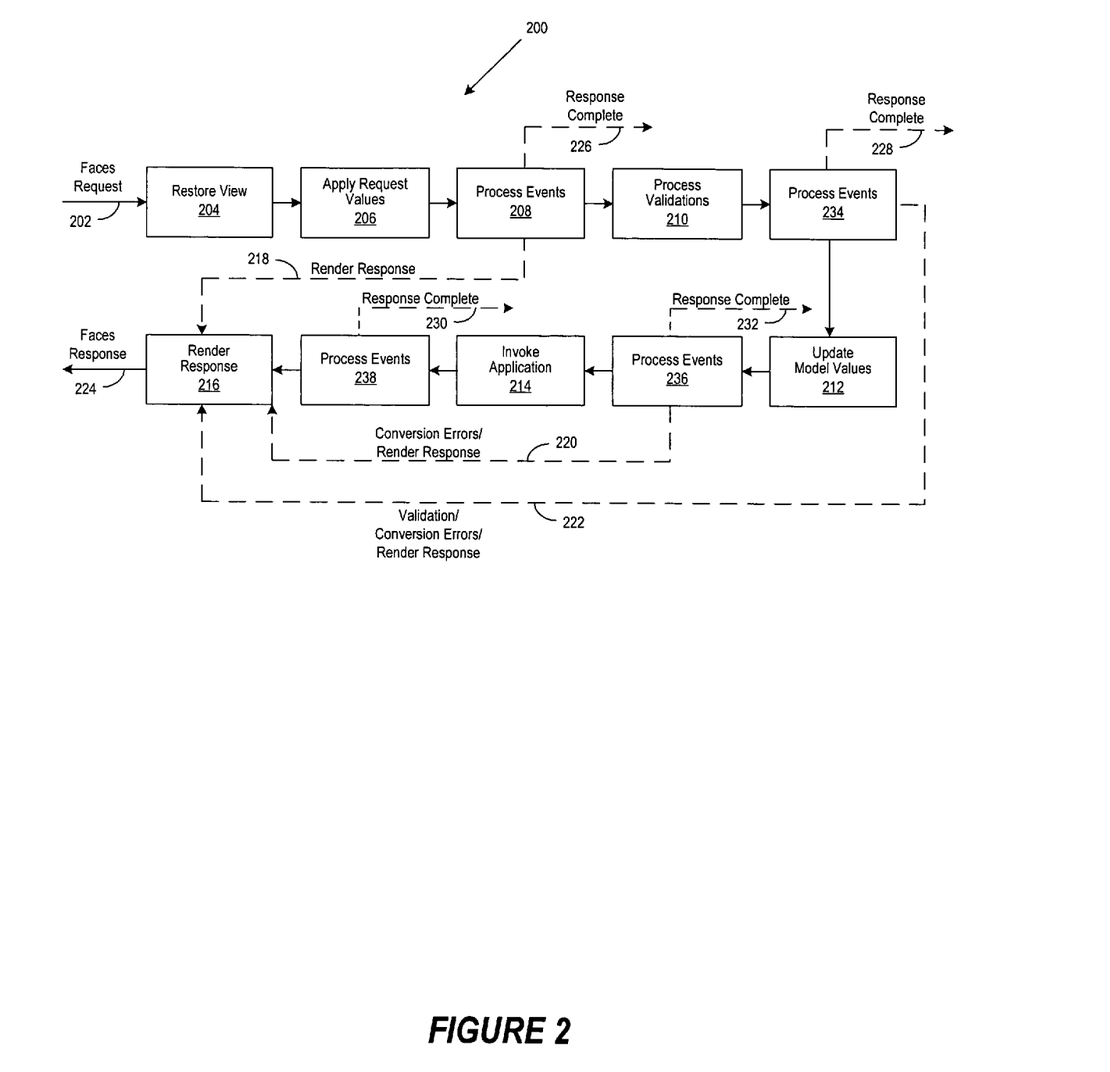
FIG. 2 shows a block diagram of a JavaServer Faces life cycle process, which handles HTTP requests with multiple phases.

Referring to FIG. 2, a block diagram of a JavaServer Faces life cycle 200 process, which handles HTTP requests with multiple phases, is shown. In this block diagram, solid lines illustrate a normal flow of control, while dashed lines illustrate alternate control flows. The life cycle handles both kinds of requests: initial requests and postbacks. When a user makes an initial request for a page, he or she is requesting the page for the first time. When a user executes a postback, he or she submits the form contained on a page that was previously loaded into the browser as a result of executing an initial request. When the life cycle handles an initial request, it only executes the restore view 204 and render response 216 phases because there is no user input or actions to process. Conversely, when the life cycle handles a postback, it executes all of the phases.

When a request 202 for a JavaServer Faces page is made, such as when a link or a button is clicked, the JavaServer Faces implementation begins the restore view phase 204.

During the restore view phase 204, the JavaServer Faces implementation builds the view of the page, wires event handlers and validators to components in the view, and saves the view in the FacesContext instance. The FacesContext instance contains all the information needed to process a single request. All the application's component tags, event handlers, converters, and validators have access to the FacesContext instance.

If the request 202 for the page is an initial request, the JavaServer Faces implementation creates an empty view during the restore view phase 204 and the life cycle advances to the render response phase 216. The empty view will be populated when the page is processed during a postback.

If the request 202 for the page is a postback, a view corresponding to this page already exists. During the restore view phase 204, the JavaServer Faces implementation restores the view by using the state information saved on the client or the server.

After the component tree is restored, each component in the tree extracts its new value from the request parameters by using its decode method during the apply request values phase 206. The value is then stored locally on the component. If the conversion of the value fails, an error message associated with the component is generated and queued on FacesContext. This message will be displayed during the render response phase 216, along with any validation errors resulting from the process validations phase 210.

For example, if the object property bound to a component has an Integer type, the JavaServer Faces implementation converts the value from a String to an Integer.

If any decode methods or event listeners called renderResponse 218 on the current FacesContext instance, the JavaServer Faces implementation skips to the render response phase 216.

If events have been queued during the apply request values phase 206, the JavaServer Faces implementation broadcasts the events 208 to interested listeners.

If some components on the page have their immediate attributes set to true, then the validation, conversion, and events associated with these components will be processed during the apply request values phase 206.

At this point, if the application needs to redirect to a different web application resource or generate a response that does not contain any JavaServer Faces components, it can call FacesContext.responseComplete 226.

At the end of the apply request values phase 206, the components are set to their new values, and messages and events have been queued.

During the process validations phase 210, the JavaServer Faces implementation processes all validators registered on the components in the tree. It examines the component attributes that specify the rules for the validation and compares these rules to the local value stored for the component.

If the local value is invalid 222, the JavaServer Faces implementation adds an error message to the FacesContext instance, and the life cycle advances directly to the render response phase 216 so that the page is rendered again with the error messages displayed. If there were conversion errors 222 from the apply request values phase 206, the messages for these errors are also displayed.

If any validate methods or event listeners called renderResponse 222 on the current FacesContext, the JavaServer Faces implementation skips to the render response phase 216.

At this point, if the application needs to redirect to a different web application resource or generate a response that does not contain any JavaServer Faces components, it can call FacesContext.responseComplete 228.

If events have been queued during the process validations phase, the JavaServer Faces implementation broadcasts them 234 to interested listeners.

After the JavaServer Faces implementation determines that the data is valid, it can walk the component tree and set the corresponding server-side object properties to the components' local values during the update model values phase 212. The JavaServer Faces implementation will update only the bean properties pointed at by an input component's value attribute. If the local data cannot be converted 220 to the types specified by the bean properties, the life cycle advances directly to the render response phase 216 so that the page is rerendered with errors displayed. This is similar to what happens with validation errors 222.

If any updateModel methods or any listeners called render-Response 220 on the current FacesContext instance, the JavaServer Faces implementation skips to the render response phase 216.

At this point, if the application needs to redirect to a different web application resource or generate a response that does not contain any JavaServer Faces components, it can call FacesContext.responseComplete 232.

If events have been queued during the update model values phase 212, the JavaServer Faces implementation broadcasts them 236 to interested listeners.

During the invoke application phase 214, the JavaServer Faces implementation handles any application-level events, such as submitting a form or linking to another page.

At this point, if the application needs to redirect to a different web application resource or generate a response that does not contain any JavaServer Faces components, it can call FacesContext.responseComplete 230.

If the view being processed was reconstructed from state information from a previous request and if a component has fired an event, these events are broadcast 238 to interested listeners.

Consider the example of a UICommand component with its action attribute set to a static outcome. When processing the corresponding ActionEvent, a default ActionListener implementation retrieves the outcome from the component's action attribute. The listener passes the outcome to the default NavigationHandler. The NavigationHandler matches the outcome to the proper navigation rule defined in the application's application configuration resource file to determine which page needs to be displayed next. The JavaServer Faces implementation then sets the response view to that of the new page. Finally, the JavaServer Faces implementation transfers control to the render response phase 216.

During the render response phase 216, the JavaServer Faces implementation delegates authority for rendering the page to the JSP container if the application is using JSP pages. If this is an initial request, the components represented on the page will be added to the component tree as the JSP container executes the page. If this is not an initial request, the components are already added to the tree so they needn't be added again. In either case, the components will render themselves as the JSP container traverses the tags in the page.

If the request is a postback and errors were encountered during the apply request values phase 206, process validations phase 210, or update model values phase 212, the original page is rendered during the render response phase 216. If the pages contain message or messages tags, any queued error messages are displayed on the page.

After the content of the view is rendered, the state of the response is saved so that subsequent requests can access it and it is available to the restore view phase 204.

Figure 3:
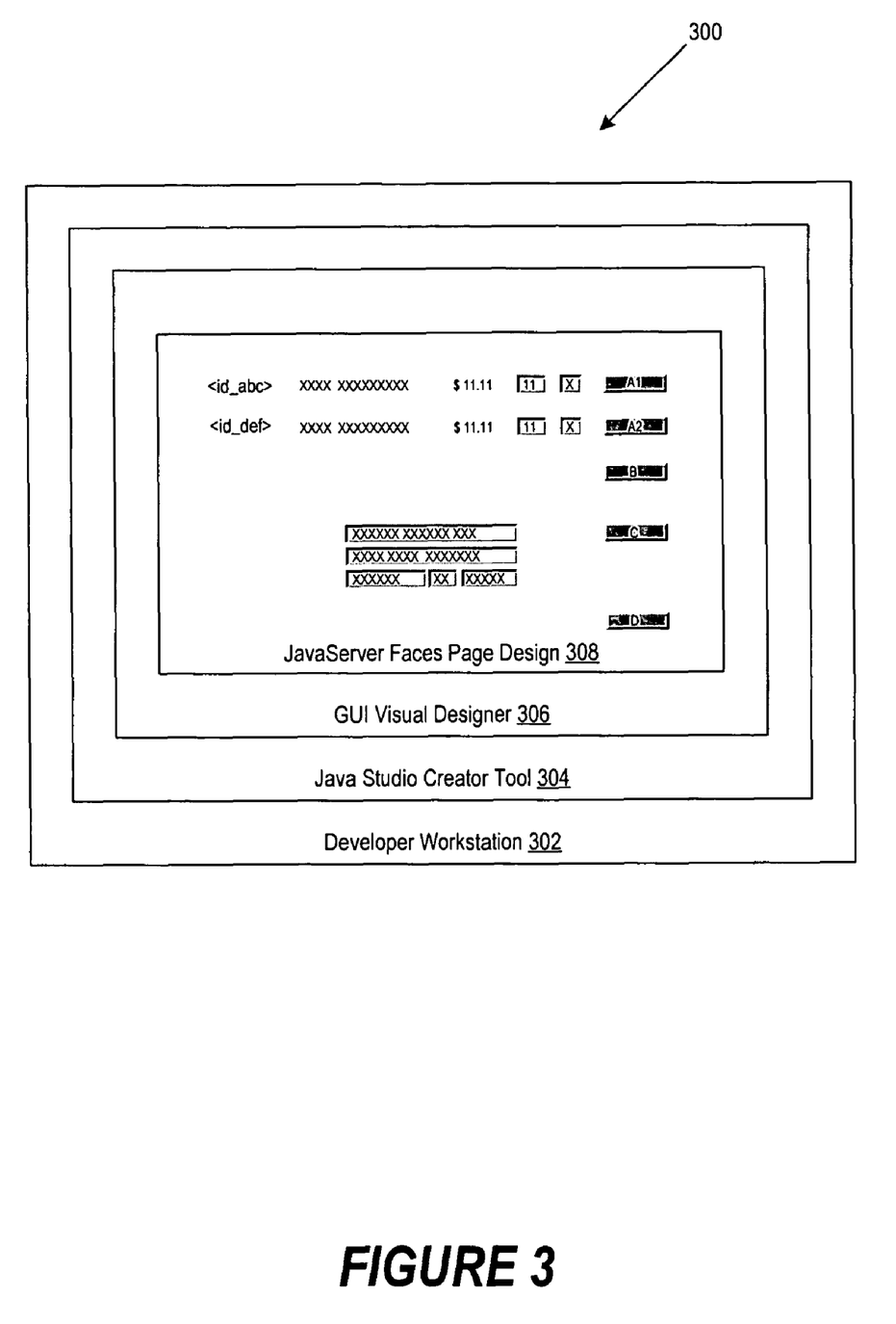
FIG. 3 shows an implementation of a visual representation of virtual forms within a GUI development environment.

Referring to FIG. 3, a block diagram of an implementation of a visual representation of virtual forms 300 is shown. In this block diagram, a developer workstation 302 runs an integrated development environment (IDE) program, such as the Java Studio Creator Tool 304 produced by Sun Microsystems, with which a developer can create applications that execute against an input processing framework, such as the JavaServer Faces framework, also produced by Sun Microsystems. The IDE program supports a GUI visual designer 306 with which the developer can visually configure virtual forms for a GUI view, such as a JavaServer Faces page 308.

Figure 4:
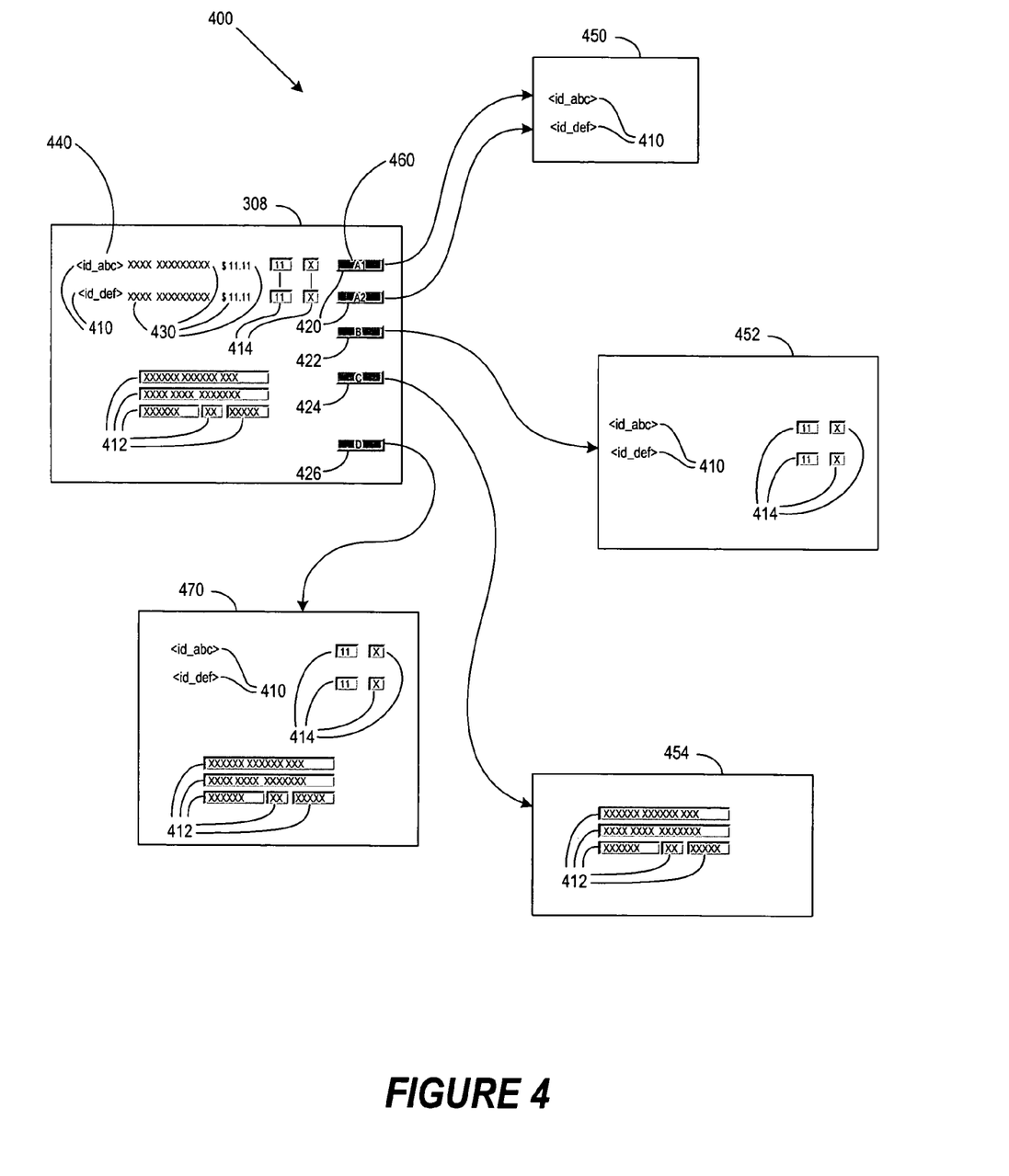
FIG. 4 shows a flow diagram as how inputs are processed depending on user gesture in a GUI.

Referring to FIG. 4, a flow diagram of a JavaServer Faces implementation 400 of a virtual forms function is shown. A JavaServer Faces Page 308 includes a plurality of input component subsets 410, 412, 414 and a plurality of submission components 420, 422, 424, 426. Components 410, 420 and the components within component subsets 430, 414 are embedded within a table component that is displaying two rows. Therefore, two representations of these components are displayed, one representation of each component per row. Input component 410 is a hidden input component containing the ID of a line item, and each line item is being displayed in a row of the table. For instance, representation 440 of input component 410 uniquely identifies the line item being displayed in the first row. Component subset 430 contains two output-only components (e.g., static text). Submission components 420, 422, and 424 respectively submit virtual forms 450, 452 and 454 for processing by the input processing framework. Submission for processing is initiated through a user gesture (e.g., clicking the appropriate button which is one of many possible user gestures).

When the user clicks one of the representations of submission component 420 and thereby submits virtual form 450 for processing, input component 410 of JavaServer Faces Page 308 is exclusively processed since it participates in virtual form 450. Likewise, when the user clicks submission component 422 and thereby submits virtual form 452 for processing, both input component 410 and input component subset 414 of JavaServer Faces Page 308 are exclusively processed, since they participate in virtual form 452. Similarly, when the user clicks submission component 424 and thereby submits virtual form 454 for processing, input component subset 412 of JavaServer Faces Page 308 is exclusively processed, since it participates in virtual form 454.

Note that some virtual form implementations, as an additional feature, may further limit processing when a user activates (e.g., clicks) a representation of a submission component embedded within a table component. Specifically, such implementations do not process inputs in rows of the table other than the row in which the user activated the submission component representation. For instance, when a user activates representation 460 of submission component 420, such implementations exclusively process representation 440 of input component 410, and forego processing any other inputs, including representations of input component 410 in other rows.

As an alternative to submitting a virtual form, the user can submit the literal form 470 through user gesture (e.g., button click) of submission component 426. Submission component 426 submits literal form 470, which is contained within JavaServer Faces Page 308, for processing by the input processing framework. Furthermore, a developer can create an application using a graphical user interface (GUI) design tool, such as the Java Studio Creator design tool, to specify a virtual form configuration for a web page. The configuration of the virtual form can then be persisted as a property of the Form component. This configuration can include all of the virtual forms associated with the web page, the names of those virtual forms, the input components that participate in each virtual form, and the submission components that submit each virtual form. In a variation of this virtual form configuration, submission components can include not only buttons and links, but also other components configured to send a request to the server via client-side scripting.

In the Java Studio Creator design tool, any component that implements the EditableValueHolder interface is considered an input component, and any component capable of initiating input processing by sending a request to the server is considered a submission component. A submission component implements the ActionSource interface and/or both implements the EditableValueHolder interface and exposes an appropriate JavaScript-related property (e.g., onchange, onChange, onclick, or onClick) to submit a virtual form. Note that an ActionSource component need not expose an appropriate Java Script-related property (e.g., onclick or onClick) in order to submit a virtual form unless it is embedded within a UIData (or a similarly behaving component with respect to wrapping ActionEvents).

When designing an application in the Java Studio Creator design tool, if a developer configures a submission component that does not implement ActionSource as submitting a virtual form, the developer must make sure that the appropriate JavaScript-related property (onchange, on Change, onclick, or onClick) is populated with JavaScript that at run-time will (1) populate a predetermined hidden field, known as the virtual form hidden field, with the (possibly qualified) id of that submission component, and (2) insert the virtual form hidden field into the client-side DOM of the web page. At run-time, a user's interacting with the submission component will invoke that JavaScript, which, in turn, will populate the value of the virtual form hidden field with the (possibly qualified) id of the submission component and insert the hidden field into the client-side DOM of the web page. During runtime processing, the value of the virtual form hidden field is inspected to determine if a virtual form was submitted. If it cannot be determined that a virtual form was submitted by inspecting the virtual form hidden field, any queued ActionEvents will be inspected to determine if a virtual form was submitted. Regardless of how it is determined, if a virtual form was indeed submitted, only the values of the input components configured as participating in that virtual form will be processed. Thus, unlike the immediate mechanism in JavaServer Faces, no other changes to the JavaServer Faces life cycle occur as the result of a virtual form submission.

The Java Studio Creator design tool also offers the feature of conditionally retaining or discarding non-participating submitted values. Therefore, during the apply request values phase of the JavaServer Faces life cycle, if it is determined that a virtual form has been submitted, the submitted values of any non-participating input components on the page are removed and cached. During the render response phase of the JavaServer Faces life cycle, if the page being rendered was posted back during the current request, the cached submitted values are restored, except for any submitted values explicitly discarded by the application via the API provided for that purpose.

The foregoing describes how virtual forms are implemented in Java Studio Creator. Eventually, virtual forms may be implemented in the JavaServer Faces framework itself. The following describes one approach to how that may be accomplished. The JavaServer Faces framework would establish a predetermined hidden field, referred to as the virtual form hidden field. A user's interacting with a submission component configured as submitting a virtual form would invoke JavaScript that populates the value of the virtual form hidden field with the (possibly qualified) id of that submission component or, alternatively, the name of the virtual form that should be considered submitted. Components eligible to participate in virtual forms would implement a specialized interface that extends the EditableValueHolder interface of JavaServer Faces, which may be referenced as VirtualFormParticipant, and thereby expose a virtualForms property. This specialized interface would include two methods, one that obtains the value of the virtualForms property, and one that sets the value of the virtualForms property. The virtualForms property would hold a list of any virtual forms in which the component participates.

All components eligible to be capable of submitting a virtual form would implement a specialized interface, which may be referenced as VirtualFormSubmitter, and expose a virtualFormToSubmit property. The interface would include two methods, one that obtains the value of the virtualFormToSubmit property, and one that sets the value of the virtualFormToSubmit property, which indicates the virtual form that the component submits. During rendering, if a component implements the VirtualFormSubmitter interface and its virtualFormToSubmit property is populated, the component renderer would emit appropriate client-side scripting (though this may be optional if the component implements ActionSource). This scripting is structured such that when the referenced submission component is activated, the virtual form hidden field is populated with the (possibly qualified) id of the submission component, or, alternatively, with the name of the virtual form that the component submits, and a request is then sent to the server.

During the Apply Request Values phase, the value of the virtual form hidden field can be inspected to determine if a virtual form was submitted. If a virtual form was submitted, those components implementing VirtualFormParticipant, and not configured as participating in that virtual form, forego populating their submitted value. As a result, only the values for participating input components and input components that do not implement VirtualFormParticipant, are further processed, and can subsequently be converted, validated, and mapped onto binding targets in the Process Validations and Update Model Values phases. Thus, this approach provides backward compatibility, as input components that do not implement VirtualFormParticipant or VirtualFormSubmitter are not affected by the virtual forms mechanism. Additionally, unlike the immediate mechanism in JavaServer Faces, no other changes to the or JavaServer Faces life cycle occur as the result of a virtual form submission. Furthermore, such an approach to implementing virtual forms within the JavaServer Faces framework could also offer the feature of conditionally retaining or discarding non-participating submitted values.

The present Sun Java Studio Creator tool does not offer visual design support for configuring virtual forms within page fragments. A page fragment is a reusable subview that can be nested in multiple top-level pages. However, in the future, the Sun Java Studio Creator tool may offer such support. In implementing such support, one possible approach would be for the page fragment to have its own virtual form configuration. When a user activated a virtual form submitter within the page fragment, that virtual form's participants would be exclusively processed. No other inputs in the top-level page that included the page fragment would be processed, including any non-participating inputs in the top-level page itself or any non-participating inputs in any directly or recursively nested page fragments. The feature of conditionally retaining or discarding non-participating submitted values would apply to non-participating inputs in page fragments just as it does for non-participating inputs in top-level pages.

Figure 5:
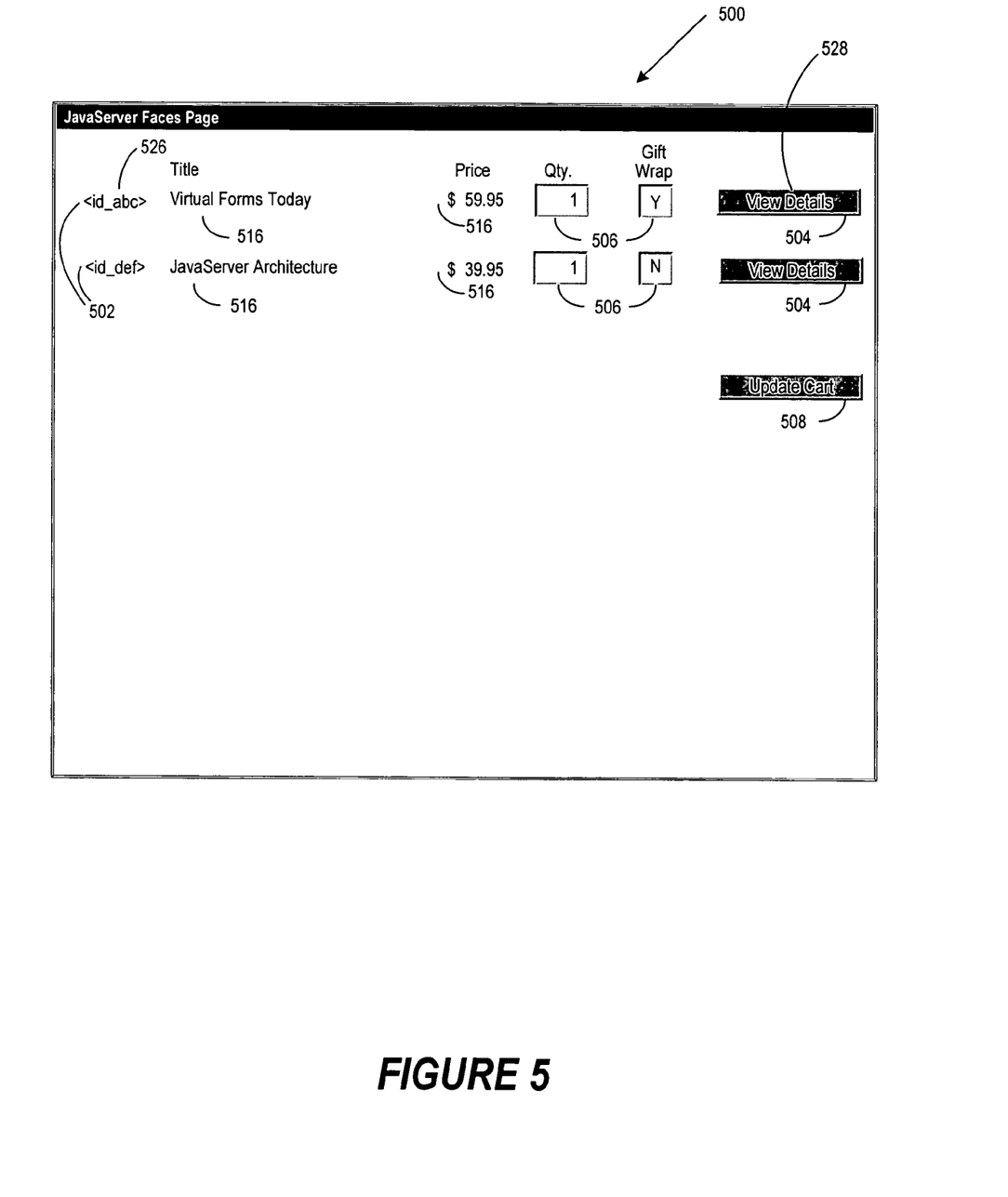
FIG. 5 shows an example of a screen presentation of a JavaServer Faces page GUI using a single virtual form.

FIG. 5 shows an example of a screen presentation of a JavaServer Faces page GUI using a single virtual form. In this screen presentation, JavaServer Faces Page 500 includes input component 502, input component subset 506, and submission components 504, 508. Input component 502 is a hidden input component containing the ID of a line item, and each line item is being displayed in a row of a table component. Component subset 516 contains two output-only components (e.g., static text). Submission component 504 is configured as submitting virtual form 'A,' in which input component 502 participates. Submission for processing is initiated through a user gesture (i.e., clicking the appropriate button), which is one of many possible user gestures. When the user clicks one of the representations of submission component 504 and thereby submits virtual form 'A,' input component 502 is exclusively processed, while input component subset 506, which does not participate in virtual form 'A,' is not processed. Note that some virtual form implementations, as an additional feature, will further limit processing, such that the user's clicking representation 528 of submission component 504 will cause representation 526 of input component 502 to be exclusively processed, with no other inputs being processed, including representations of input component 502 in other rows. As an alternative to submitting a virtual form, the user can submit all input component subsets 502, 506, associated with JavaServer Faces Page 500, through user gesture (e.g., button click) of submission component 508. Submission component 508 submits a literal form which includes input component subsets 502, 506 for processing by the input processing framework.

Figure 6:
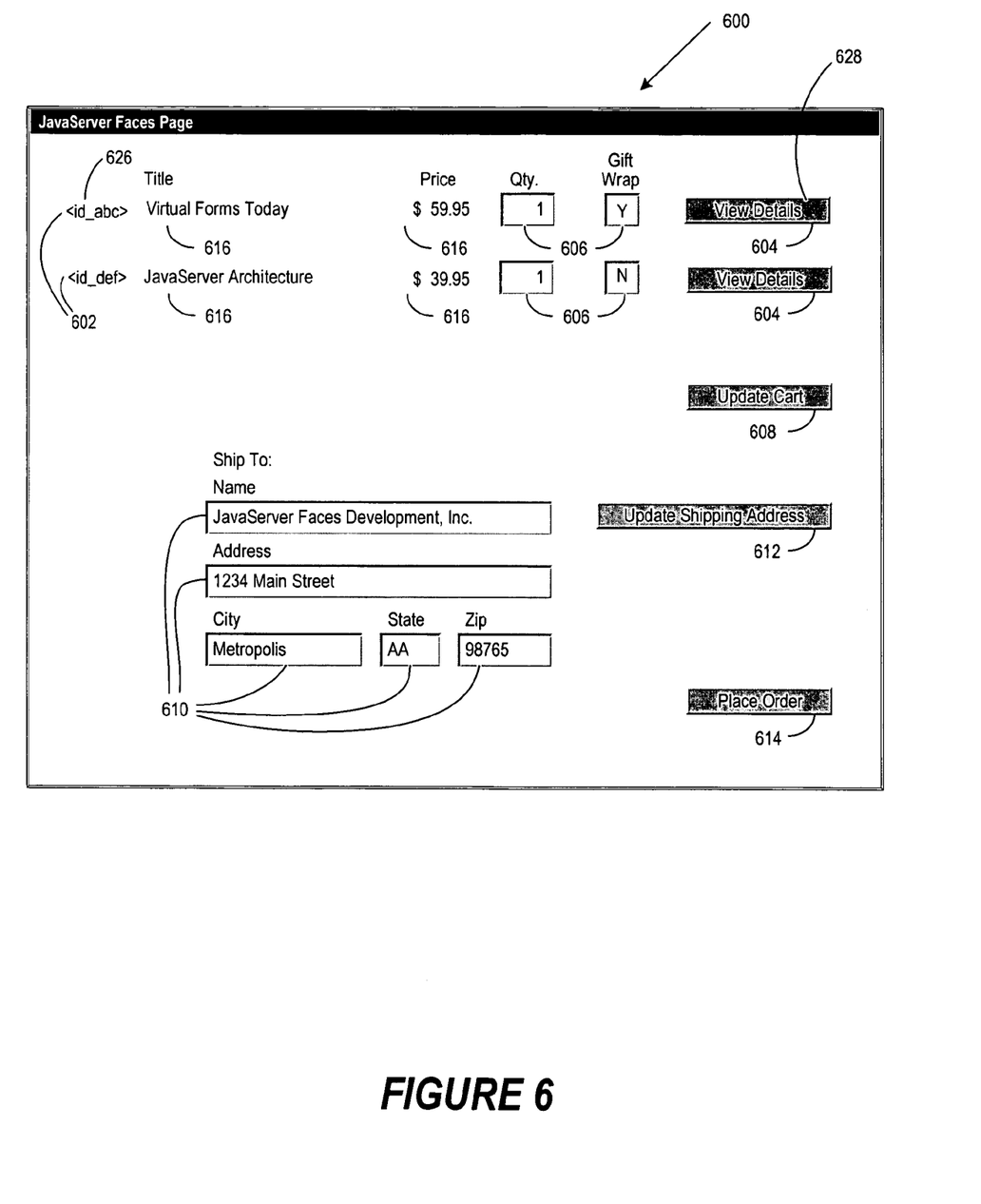
FIG. 6 shows an example of a screen presentation of a JavaServer Faces page GUI using a plurality of virtual forms.

FIG. 6 shows an example of a screen presentation of a JavaServer Faces page GUI using a plurality of virtual forms. In this screen presentation, JavaServer Faces Page 600 includes input component 602, input component subsets 606 and 610, and submission components 604, 608, 612, 614. Input component 602 is a hidden input component containing the ID of a line item, and each line item is being displayed in a row of a table component. Component subset 616 contains two output-only components (e.g., static text). Submission components 604, 608, and 612 are configured as submitting virtual forms 'A,' 'B,' and 'C,' respectively, for processing by the input processing framework. Submission for processing is initiated through a user gesture (i.e., clicking the appropriate button), which is one of many possible user gestures.

Submission component 604 is configured as submitting virtual form 'A,' in which input component 602 participates. Submission for processing is initiated through a user gesture (i.e., clicking the appropriate button), which is one of many possible user gestures. When the user clicks one of the representations of submission component 604 and thereby submits virtual form 'A,' input component 602 is exclusively processed, while input component subsets 606 and 610, which do not participate in virtual form 'A,' are not processed. Note that some virtual form implementations, as an additional feature, will further limit processing, such that the user's clicking representation 628 of submission component 604 will cause representation 626 of input component 602 to be exclusively processed, with no other inputs being processed, including representations of input component 602 in other rows. Submission component 608 is configured as submitting virtual form 'B,' in which input component 602 and input component subset 606 both participate. When the user clicks submission component 608, input component 602 and input component subset 606 are exclusively processed while input component subset 610 is not processed. Similarly, submission component 612 is configured as submitting virtual form 'C,' in which input component subset 610 participates. When the user clicks submission component 612, input component subset 610 is exclusively processed while input component 602 and input component subset 606 are not processed. Alternatively, the user can submit all input component subsets 602, 606, 610, associated with JavaServer Faces Page 600, through user gesture (e.g., button click) of submission component 614. Submission component 614 submits a literal form containing input component subsets 602, 606, 610 for processing by the input processing framework.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, use of the invention provides the ability for a plurality of predetermined input component subsets, each including a plurality of available input components, to be selectively processed by an input processing framework, based on user gesture. Further, these input component subsets can be designated as participating in virtual forms, while any available submission component can be designated as submitting a virtual form, such that a user's interacting with such a submission component will cause that virtual form to be considered submitted, in which case the input components that participate in that virtual form will be exclusively processed by the input processing framework. In addition, the present invention provides the ability to construct virtual forms via graphical user interface (GUI) tools to facilitate and speed application development.

Also, for example, additional phases and control flows are within the scope of the invention. Also, for example, referring to FIG. 4, many different possible combinations of JavaServer Faces Page 308, input component subsets 410, 414, 412, submission components 420, 422, 424, 426, virtual forms 450, 452, 454, and literal form 470 are contemplated.

Also for example, the above-discussed embodiments include modules and units that perform certain tasks. The modules and units discussed herein may include hardware modules or software modules. The hardware modules may be implemented within custom circuitry or via some form of programmable logic device. The software modules may include script, batch, or other executable files. The modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Additionally, those skilled in the art will recognize that the separation of functionality into modules and units is for illustrative purposes. Alternative embodiments may merge the functionality of multiple modules or units into a single module or unit or may impose an alternate decomposition of functionality of modules or units. For example, a software module for calling sub-modules may be decomposed so that each sub-module performs its function and passes control directly to another sub-module. Consequently, the invention is intended to be limited only by the spirit and scope of the appended claims, giving full cognizance to equivalents in all respects.

What is claimed is:

1. A method for an input processing framework system to conditionally process a subset of values available to the system depending on an object initiating processing, the method comprising:

providing virtual form configuration metadata about an overall set of objects, where each object in the overall set can be a value holder, an initiator, or both a value holder and an initiator, the value holder holding a value that can be processed by the system, the initiator triggering the processing;

wherein the metadata comprises a plurality of virtual forms, with each virtual form optionally identifying a name, and with each virtual form identifying zero or more of the value holders from the overall set as participants in that virtual form, and with each virtual form identifying one or more initiators from the overall set as submitters of that virtual form, such that each value holder from the overall set can be identified as a participant in zero or more virtual forms, and such that each initiator from the overall set can be identified as a submitter of zero or one virtual form, and each value holder from the overall set can be identified as a participant in two or more virtual forms, such that when an initiator that is identified as a submitter of a virtual form triggers processing by the system, the system processes only the values held by the value holders that are identified as participants in that virtual form, and the system does not process the values held by value holders that are not identified as participants in that virtual form, and, wherein processing includes the input processing framework system itself performing operations on the held values, the operating including performing all configured conversions on the held values, invoking all configured validation checks on the held values, evaluating all bindings configured on the value holders holding the held values, and storing each held value in a location determined by the evaluating; and displaying, on a display, two or more virtual forms at the same time.

2. The method of claim 1 wherein:

an object in the overall set that is both a value holder and an initiator and that is identified as a participant in one or more virtual forms can simultaneously be identified as a submitter of one of those virtual forms or a different virtual form.

3. The method of claim 1 wherein:

when an initiator that is identified as a submitter of a virtual form triggers processing by the system, the implementation of the input processing framework system is able conditionally either to retain or discard the unprocessed value of each value holder that does not participate in that virtual form, wherein some such implementations of the input processing framework system expose an API that can be used to establish whether each such value holder retains or discards its unprocessed value at a particular point in time.

4. The method of claim 1 wherein:

the objects in the overall set are visual or non-visual user interface (UI) components that operate within the input processing framework system;

the input processing framework system is capable of being used by software applications that present a UI, such as web applications or rich client UI applications;

the value holder objects are input components, an input component being any component capable of accepting input, the initiator components are submission components, a submission component being any component capable of initiating processing, such as, in the case of a web application, any button, link, or component configured with client-side scripting that causes a request to be made to the server application that uses an input processing framework.

5. The method of claim 4 wherein:

the method places no topographical limitations on where the user interface (UI) components can be positioned within the user interface, even a user interface that does not use CSS (cascading style sheets) positioning or a similar technology for the positioning of user interface (UI) components.

6. The method of claim 4 wherein:

when an initiator that is embedded within a row of a table component and that is identified as a submitter of a virtual form triggers processing by the system, some implementations of the input processing framework system impose an additional limitation on which values are processed, the limitation being that such implementations do not process the values held by value holders that appear in rows of the table other than that row.

7. A computer-readable storage medium having information stored thereon for directing a processor to conditionally process a subset of values available to an input processing framework system depending on an object initiating processing, the information comprising:

instructions for providing virtual form configuration metadata about an overall set of objects, where each object in the overall set can be a value holder, an initiator, or both a value holder and an initiator, the value holder holding a value that can be processed by the system, the initiator triggering the processing;

wherein the metadata comprises a plurality of virtual forms, with each virtual form optionally identifying a name, and with each virtual form identifying zero or more of the value holders from the overall set as participants in that virtual form, and with each virtual form identifying one or more initiators from the overall set as submitters of that virtual form, such that each value holder from the overall set can be identified as a participant in zero or more virtual forms, and such that each initiator from the overall set can be identified as a submitter of zero or one virtual form, and each value holder from the overall set can be identified as a participant in two or more virtual forms, such that when an initiator that is identified as a submitter of a virtual form triggers processing by the system, the system processes only the values held by the value holders that are identified as participants in that virtual form, and the system does not process the values held by value holders that are not identified as participants in that virtual form, and, wherein processing includes the input processing framework system itself performing operations on the held values, the operating including performing all configured conversions on the held values, invoking all configured validation checks on the held values, evaluating all bindings configured on the value holders holding the held values, and storing each held value in a location determined by the evaluating; and instructions for displaying two or more virtual forms at the same time.

8. The storage medium of claim 7 wherein:

an object in the overall set that is both a value holder and an initiator and that is identified as a participant in one or more virtual forms can simultaneously be identified as a submitter of one of those virtual forms or a different virtual form.

9. The storage medium of claim 7 wherein:

when an initiator that is identified as a submitter of a virtual form triggers processing by the system, the implementation of the input processing framework system is able conditionally either to retain or discard the unprocessed value of each value holder that does not participate in that virtual form, wherein some such implementations of the input processing framework system expose an API that can be used to establish whether each such value holder retains or discards its unprocessed value at a particular point in time.

10. The storage medium of claim 7 wherein:

the objects in the overall set are visual or non-visual user interface (UI) components that operate within the input processing framework system;

the input processing framework system is capable of being used by software applications that present a UI, such as web applications or rich client UI applications;

the value holder objects are input components, an input component being any component capable of accepting input, the initiator components are submission components, a submission component being any component capable of initiating processing, such as, in the case of a web application, any button, link, or component configured with client-side scripting that causes a request to be made to the server application that uses an input processing framework.

11. The storage medium of claim 10 wherein:

no topographical limitations are placed on where the user interface (UI) components can be positioned within the user interface, even a user interface that does not use CSS (cascading style sheets) positioning or a similar technology for the positioning of user interface (UI) components.

12. The storage medium of claim 10 wherein:

when an initiator that is embedded within a row of a table component and that is identified as a submitter of a virtual form triggers processing by the system, some implementations of the input processing framework system impose an additional limitation on which values are processed, the limitation being that such implementations do not process the values held by value holders that appear in rows of the table other than that row.

* * * * *